Oct. 16, 1928.

R. MILECZ

TOOL HOLDER

Filed July 8, 1927  2 Sheets-Sheet 1

1,688,284

RUDOLPH MILECZ
INVENTOR

BY Victor J. Evans
ATTORNEY

Oct. 16, 1928.
R. MILECZ
TOOL HOLDER
Filed July 8, 1927
1,688,284
2 Sheets-Sheet 2
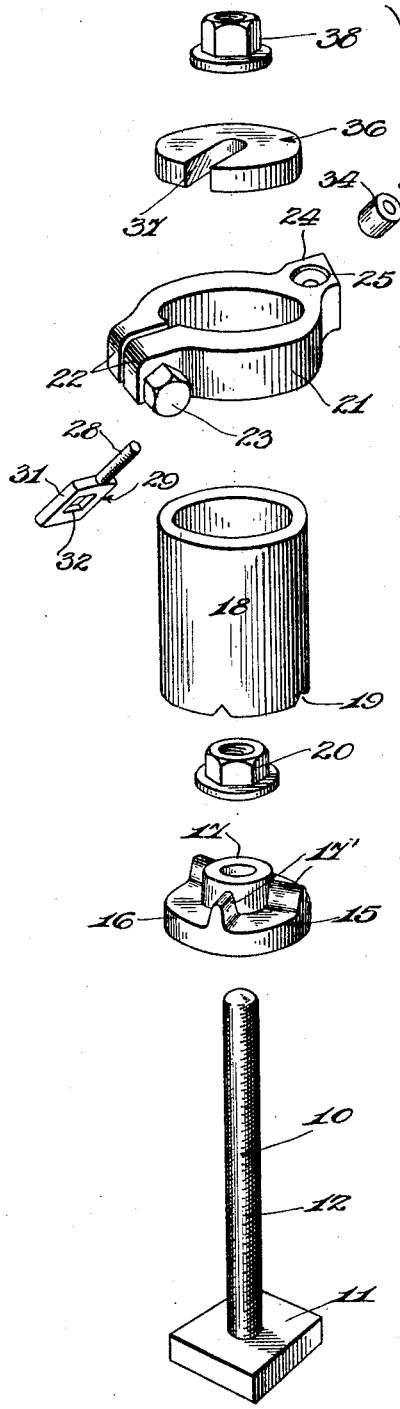
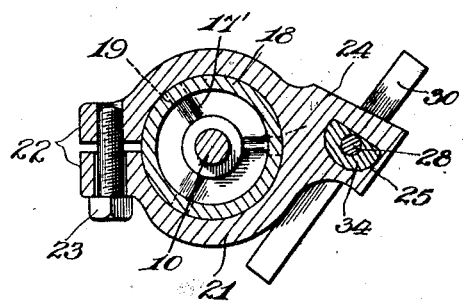
Fig. 4.
Fig. 5.
RUDOLPH MILECZ
INVENTOR
BY Victor J. Evans
ATTORNEY Patented Oct. 16, 1928.

1,688,284

UNITED STATES PATENT OFFICE.

RUDOLPH MILECZ, OF HOBOKEN, NEW JERSEY, ASSIGNOR TO JULIUS GLUCK, OF NEW YORK, N. Y.

TOOL HOLDER.

Application filed July 8, 1927. Serial No. 204,383.

This invention relates to improvements in tool holders of the kind shown and described in my U. S. Letters Patent #1,214,347, dated June 30th, 1917.

The primary object of the invention resides in a tool holder for turning lathes and the like in which the tool may be removed from the holder and replaced without disturbing the set of the tool, thereby saving much time which is usually consumed in making the necessary readjustments.

Another object of the invention is to provide a tool holder embodying a triple contact tool carrying base, and a tool carrying post detachably connected therewith, the parts being so constructed as to enable the post to be removed and replaced without disturbing the set of the tool held thereby.

A further object of the invention is to provide a tool carrying head adjustably embracing the tool carrying post and capable of being rigidly fixed therewith.

A still further object is the provision of a tool holder in which any one of a plurality of set tools may be interchangeably associated therewith and which might be used upon the piece of work.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 4 is a horizontal sectional view on the line 4—4 of Figure 1.

Figure 5 is a collective perspective view of the parts of the tool holder in a separated condition.

Figure 1:
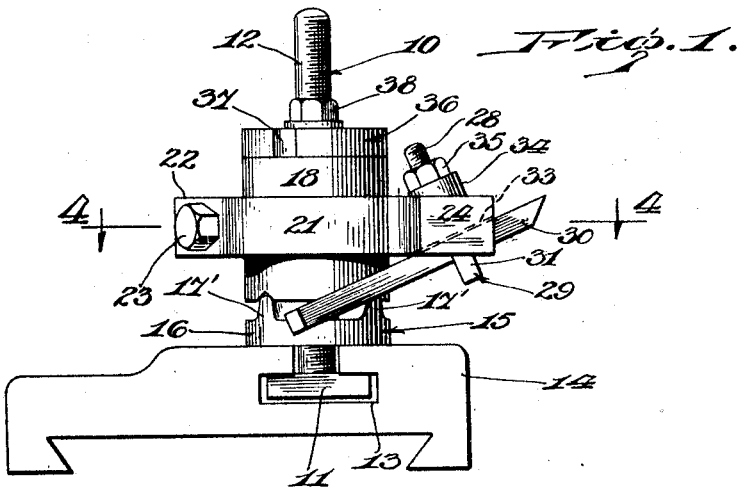
Figure 1 is a side elevation of my improved tool holder in position upon a slide rest.
Figure 2:
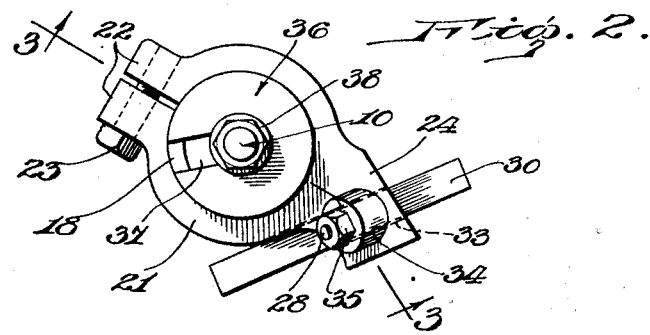
Figure 2 is a top plan view.

Referring more particularly to the drawings, the reference numeral 10 designates a bolt having a square head 11 and a threaded shank 12. The head 11 is received in the inverted T-shaped slot 13 of a sliding rest 14 and which is slidable over the body of a turning lathe (not shown). The shank 12 rises vertically from the slide rest and receives a base member 15 in the form of a flat disk 16 having an annular flange 17 rising therefrom, while three pointed lugs 18 rise from the disk and are arranged radially about the flange 17 to provide a triple contact seat for a tubular post or sleeve 18. The lower end of the sleeve is provided with three V-shaped notches 19 for receiving the respective lugs 15 for properly aligning the sleeve for a purpose to be presently explained. The base member 15 rests upon the top of the slide rest and is clamped thereagainst by a nut 20 which co-acts with the threaded end of the shank 12 and which abuts the flange 17 of the base member when screwed home.

Carried by the tubular post or sleeve 18 is a split ring clamp or tool head 21, the split ends being provided with ears 22 through which a clamping bolt or screw 23 passes. The ring clamp or tool head is adjusted upon the tubular post to the desired height and is held rigid by the clamping screw 23. The ring clamp is provided with an enlarged portion 24 which is provided with an upper recess 25 and a lower recess 26, which recesses are divided by a partition 27 from which the shank 28 of a tool holder element 29 passes. The axis of the opening and the recesses is at an acuate angle with respect to the axis of the clamping ring for supporting a tool 30 at an angle in a manner to be now described.

Figure 3:
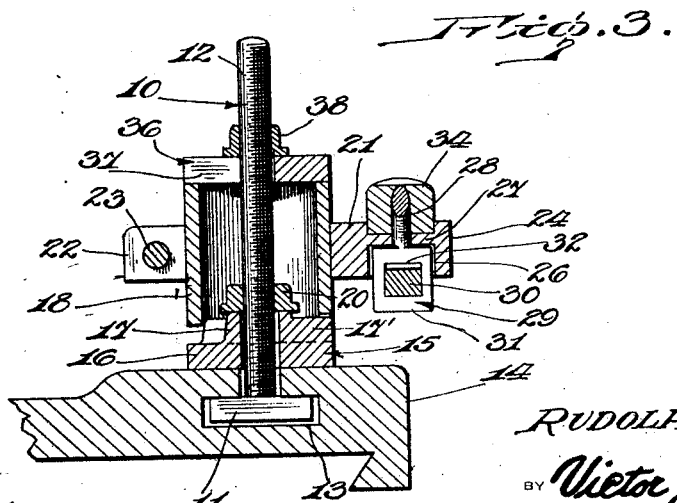
Figure 3 is a vertical sectional view on the line 3—3 of Figure 2.

The tool holder element 29 has a flat elongated head 31 on one end of the shank 28 and which is received in the recess 26, while the head 31 is provided with an elongated slot 32 through which the tool 30 extends. The underside of the enlarged portion 24 is provided with a channel 33 for receiving and steadying the tool 30 and when the holder is in a set position, one end wall of the slot 32 bears against the tool and pulls the same against the top wall of the channel 33 as clearly shown in Figure 3 of the drawings. For holding the tool 30 set, I provide a spacing collar 34 which surrounds the threaded end of the shank 28 and seats in the recess 25. A retaining nut 30 co-acts with the threads on the shank 28 and when tightened down against the collar 34, serves to hold the parts in a clamped condition.

The top of the shank 12 of the bolt 10 extends above the top of the post or sleeve 18 and receives a disk or washer 36 having a slot 37 extending inwardly from the peripheral edge thereof to the axial center of the same. The washer may be applied laterally to the shank and rests upon the top of the post or sleeve 18 where it is held down by a retaining nut 38 which co-acts with the threads on the end of the shank 12. When the nut 38 is tightened down upon the washer 36, the post or sleeve 18 is held down tight upon the seats provided on the base member. However, when it is desired to remove the tubular post or sleeve 18, the nut 38 is unscrewed but does not have to be entirely unscrewed from the shank 12, as the washer may be slid laterally and removed from the top of the post, whereupon the post is free to be lifted off its seat and over the end of the shank 12.

In a tool holder of this construction, it is possible to initially set a plurality of tools in separate ring clamps or heads, and the clamps adjusted on individual tubular posts or collars 18 for use in connection with a piece of work, and which post and ring clamp and cutting tool constitute a cutting unit for interchangeable association with a single base member and its several other co-acting parts. This dispenses with the usual practice of resetting the tool for the different cutting operations which requires a considerable waste of time and energy. By having three lugs or seats 15 on the base member and a corresponding number of notches in the posts, it is possible to accurately replace the cutting unit in position as the base member 14 is always held in a set position on the slide rest by the nut 20. The tool bits in a construction of this kind are prevented from mutilation as it is not necessary to continuously adjust the same because after being initially adjusted, the tool is maintained in a set position until such time as it becomes necessary to again adjust the tool.

It might be mentioned that the different heads or ring clamps 21 have channels 33 of different angles so that the angle of the tool seated therein need not be adjusted as the said angle is set.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A tool holder comprising a bolt, a base member on said bolt, a nut threaded to said bolt and bearing against said base member, a tool holding unit seated on said base member, means for removably holding said tool holding unit seated on said base member embodying a washer on said bolt bearing against said tool holding unit, a nut threaded to said bolt and bearing against said washer, and co-acting means between said base member and said tool holding unit for properly aligning said tool holder unit with said base member, said co-acting means including spaced lugs rising from said base member and corresponding notches on said tool holder unit for receiving the respective lugs.

2. A tool holder comprising a headed bolt, a base member, a nut threaded to the shank of said bolt for holding said base member clamped down upon a supporting structure held between said base member and the head of said bolt, a tool holder unit embodying a tubular post seated on said base member and a tool head adjustably mounted on said tubular post and clamping means for removably holding said tubular post seated upon said base member, said clamping means including a slotted washer seated on the top of said tubular post, and a nut threaded to the shank of said bolt for bearing engagement with said washer.

3. A tool holder comprising a headed bolt, a base member having lugs rising therefrom, a nut threaded to the shank of said bolt for holding said base member clamped down upon a supporting structure held between said base member and the head of said bolt, a tubular post having notches for receiving the respective lugs on said base member, a tool head adjustably mounted on said tubular post, a grinding tool adjustably supported by said tool head, a washer encircling the shank of said headed bolt and seated upon the top of said tubular member, and a retaining nut on the threaded end of said bolt for engagement with said washer for holding said tubular member seated upon said base member.

4. In a tool holder, a tubular post, a split ring clamp encircling said tubular post, and a cutting tool adjustably supported by said split ring clamp, a base member provided with upstanding lugs, for respective seating in notches provided in the bottom edge of said tubular post.

5. A tool holder comprising a headed bolt, a base member, a nut threaded to the shank of said bolt for holding said base member clamped down upon a supporting structure held between said base member and the head of said bolt, a tool holding unit embodying a tubular post seated on said base member and clamping means for removably holding said tubular post seated upon said base member, said clamping means including a washer on said bolt seated on the top of said tubular post and a nut threaded to the shank of said bolt for bearing engagement with said washer.

In testimony whereof I have affixed my signature.

RUDOLPH MILECZ.